United States Patent [19]
Mekhtiev et al.

[11] 3,878,238
[45] Apr. 15, 1975

[54] METHOD OF PRODUCING METHACRYLONITRILE

[76] Inventors: Sekhrab Iskenderogly Mekhtiev, prospekt Lenina 90, blok 6, kv. 60; Mark Alexandrovich Dalin, prospekt Kirova, 21, kv. 41; Ramis Abdurab Ogly Polchaev, ulitsa 947, 3, kv. 4; Rufat Gadzhibala Ogly Mamedov, 4 mikroraion ulitsa Pishevari, 29a, kv. 60, all of Baku, U.S.S.R.

[22] Filed: Nov. 8, 1973

[21] Appl. No.: 414,106

[52] U.S. Cl. ........ 260/465.3; 260/465.6; 260/465.9
[51] Int. Cl. .......................................... C07c 121/02
[58] Field of Search............ 260/465.3, 465.9, 465.6

[56] References Cited
UNITED STATES PATENTS

| | | | |
|---|---|---|---|
| 2,441,462 | 5/1948 | Zeischke........................ | 260/465.9 |
| 3,073,753 | 1/1963 | Hadley et al.................. | 260/465.9 X |
| 3,262,963 | 7/1966 | Modiano et al............... | 260/465.9 X |
| 3,346,617 | 10/1967 | Hiroki et al..................... | 260/465.3 |
| 3,468,624 | 9/1969 | Miller et al................... | 260/465.9 X |

OTHER PUBLICATIONS
Gotkis et al., J.A.C.S., 56 (1934), pp. 2710–2712.

Migrdichian, The Chemistry of Organic Cyano Compounds, (1947) pp. 177 and 192.

*Primary Examiner*—Joseph P. Brust

[57] ABSTRACT

The method of producing methacrylonitrile resides in a catalytic reaction of isobutylene with ammonia in the presence of atmospheric oxygen at a temperature of 380 to 520°C to form a mixture containing methacrylonitrile, acetonitrile, hydrocyanic acid and the unreacted ammonia; neutralization of the unreacted ammonia; treatment of the mixture obtained after ammonia neutralization, with an equimolar amount (as to HCN) of acetone at a temperature of 0° to 50°C in the presence of an alkaline catalyst, with the formation of acetonecyanohydrin which, without being isolated from the newly prepared mixture, is treated with phosphoric anhydride in a medium of a polar organic base at a temperature of 0° to 35°C and a molar ratio of acetonecyanohydrin, phosphoric anhydride and said polar organic base equal to 1:1.5–3:2–6, respectively.

2 Claims, No Drawings

METHOD OF PRODUCING METHACRYLONITRILE

This invention relates to methods of producing methacrylonitrile.

Methacrylonitrile is known to be a universal vinyl monomer capable of improving the properties of plastics, elastomers and coatings. There are synthesized on the base of methacrylonitrile diverse methacrylic series compounds made use of in the production of organic glass, synthetic rubber, oil dopes, medical preparations, coatings for metals and wood.

In current practice a great number of methods are known for producing methacrylonitrile, e.g., by dehydrochlorination of alpha- and beta-chloroisobutyronitrile in the presence of alkaline catalysts; by dehydrating methacrylic-acid amide and acetonecyanohydrin ; or by hydrocyanation of allene and methylacetylene in the gaseous phase.

Said methods are characterized by scarcity of the starting materials, sophisticated process equipment, low yield of the end product and poor economic indices of the process.

Methods are also known for producing methacrylonitrile by a catalytic interaction of isobutylene and ammonia in the presence of atmospheric oxygen, viz., by an oxidizing isobutylene at 380°–520°C in the presence of diverse catalysts, such as bismuth-molybdenum with an addition of some elements of the groups 4 and 5 of the periodic system.

The process occurs, for example, as follows. Isobutylene, ammonia and atmospheric air taken with a molar ratio of $i\text{-}C_4H_8:NH_3:O_2$ equal to 1:2:2.5, respectively and, having been intermixed beforehand, are fed into the synthesis-reaction vessel. The process is run at 450°–460°C in the presence of a modified bismuth-molybdenum-tungsten catalyst. Upon termination of the process the resultant mixture, containing methacrylonitrile, acetonitrile and hydrocyanic acid is fed, after the unreacted ammonia has been neutralized, into the cooling and freezing-out system to isolate the mixture of the aforesaid components. The thus-isolated mixture is subjected to rectification to isolate every component in the free state.

In the afore-discussed process of oxidizing ammonolysis of isobutylene, along with the end product (70–75 moles), there are also formed acetonitrile (30–35 moles) and hydrocyanic acid (32–40 moles) as by-products per 100 moles of the reacted isobutylene, with a 95-percent conversion of the starting olefin.

A disadvantage inherent in said methods is the low yield of the end product and formation of large amounts of by-products.

It is an essential object of the present invention to provide a method of producing methacrylonitrile which would allow obtaining a high-quality end product at rather high yield by using a relatively simple process technique.

In keeping with said and other objects the invention resides in carrying out a catalytic interaction of isobutylene and ammonia in the presence of atmospheric oxygen at 380°–520°C to form a mixture, containing methacrylonitrile, acetonitrile, hydrocyanic acid and the unreacted ammonia, the unreacted ammonia is neutralized and the end product is isolated from the mixture resulting from ammonia neutralization.

According to the invention, the mixture obtained after ammonia neutralization is treated with acetone taken in an equimolar amount with respect to the hydrocyanic acid, at 0–50°C in the presence of an alkaline catalyst to form acetonecyanohydrin which, without being isolated from the thus-obtained mixture, is treated with phosphoric anhydride in a medium of a polar organic base at 0–35°C, the molar ratio of acetonecyanohydrin, phosphoric anhydride and polar organic base being 1:1.5–3:2-6, respectively.

The mixture resulting from ammonia neutralization contains methacrylonitrile, acetonitrile and hydrocyanic acid. When the mixture is treated with acetone taken in an equimolar amount with respect to the hydrocyanic acid, at a temperature of 0° to 50°C in the presence of an alkaline catalyst, the hydrocyanic acid completely reacts with the acetone.

As a result of said reaction acetonecyanohydrin is formed which, when the newly obtained mixture is treated with phosphoric anhydride in a medium of a polar organic base under the afore-specified conditions, is in turn reacted with phosphoric anhydride to form methacrylonitrile.

Application of the herein-proposed method rules out the necessity to isolate the hydrocyanic acid and acetonecyanohydrin from the reaction products in a free state, since the method enables the accomplishment of a complete processing of hydrocyanic acid through acetonecyanohydrin directly in the products of the oxidizing ammonolysis, i.e., without isolating the hydrocyanic acid from the reaction mixture. The conversion of hydrocyanic acid into acetonecyanohydrin amounts to 98 to 99 percent, while conversion of acetonecyanohydrin into methacrylonitrile runs at a quantitative yield of 95 to 97 percent.

Methacrylonitrile concentration as compared to the known method becomes as high as 78 mole percent against 50 mole percent, which greatly simplifies the process of isolating the methacrylonitrile from a methacrylonitrile-acetonitrile mixture, containing on an average, 75 to 80 mole percent methacrylonitrile and 25 to 20 mole percent acetonitrile, as compared to the mixture resultant from the oxidizing ammonolysis by the known method, wherein the methacrylonitrile concentration is as low as 50 mole percent.

Thus, the processing of hydrocyanic acid, the yield of which makes up 10 percent by weight of the converted isobutylene involved in the oxidizing ammonolysis, i.e., 30–40 moles HCN per 100 moles of the converted isobutylene, increases the yield of methacrylonitrile from 70 to 100–106 moles per 100 moles of the converted isobutylene.

The proposed method is distinguished for being a simple one from the technological viewpoint, which is achieved due to:

1. Chemical inactivity of methacrylonitrile and acetonitrile under the process conditions, viz., hydrocyanation and dehydration.

2. High separability of acetonitrile from both the binary mixture of methacrylonitrile + acetonecyanohydrin and, upon dehydration of acetonecyanohydrin, from methacrylonitrile, owing to a wide difference between their boiling points.

3. Prevention of toxic action of hydrocyanic acid due to said acid being processed immediately in the reaction mixture rather than isolated in a free state.

The method of the invention is carried into effect as follows.

Oxidizing ammonolysis of isobutylene is run at an atmospheric pressure in a pass-through reaction vessel with a stationary catalyst bed. The appropriate amounts of isobutylene, ammonia and atmospheric air are fed into the mixer, from whence said gases are directed into the reaction vessel. The process is carried out at a predetermined temperature. The reaction products in the form of a gaseous mixture, containing methacrylonitrile, acetonitrile, hydrocyanic acid and the unreacted ammonia are fed into the vessel for neutralization of the unreacted ammonia with sulfuric acid. Then the neutral gaseous mixture is passed into the condensation and freezing-out system for the reaction products. The thus obtained liquid products of isobutylene oxidizing ammonolysis, containing methacrylonitrile, acetonitrile and hydrocyanic acid are fed into the reaction vessel, whereinto are concurrently fed an equimolar amount (as to HCN) of acetone and a catalyst, viz., a hydroxide of an alkali-metal in the form of aqueous solutions thereof. The process of conversion of hydrocyanic acid into acetonecyanohydrin proceeds at a temperature of 0° to 50°C within 5 to 300 min.

Upon terminating the reaction, the newly obtained mixture, containing acetonecyanohydrin is fed into the reaction vessel, filled with phosphoric anhydride in a medium of a polar organic base. The process runs at 0° to 35°C. The reaction products are forwarded for isolation of the end product.

For a better understanding of the present invention, there are given below a number of the following specific exemplary embodiments thereof.

Example 1

The experiment is run in a pass-through reaction vessel with a stationary catalyst bed. There are fed into the reactin vessel: 1 gram-mole i-$C_4H_8$ (56 g); 2 gram-moles $HNH_3$ (34 g); and 2.5 gram-moles atmospheric $O_2$ (80 g); the reaction is run at 450°–460°C in the presence of a modified Bi-Mo-W catalyst. The resultant product which contains after neutralization of the unreacted ammonia, 44 g methacrylonitrile, 12.3 g acetonitrile and 10.2 g hydrocyanic acid, is subjected to processing.

The process of converting the hydrocyanic acid into acetonecyanhydrin (ACH) is run in a 500-$cm^3$ reaction vessel provided with a stirrer. To a mixture containing 44 g methacrylonitrile, 12.3 g acetonitrile and 10.2 g hydrocyanic acid, are added 22.0 g acetone, an amount of KOH (2 percent of the HCN and acetone weight) taken as a 40-percent aqueous solution. The reaction proceeds at 15°–20°C for 120 min.

The resultant product is dehydrated without having preliminarily been neutralized and separated, dehydration being performed with the use of phosphoric anhydride in a quinoline medium, the ratio of the components (i.e., ACH, $P_2O_5$ and quinoline) being 1:1:1, at 10° to 25°C for 15–20 min. Upon dehydration, the reaction mixture is distilled at atmospheric pressure to isolate the fraction consisting of 84.5 weight percent methacrylonitrile and 15.5 weight percent acetonitrile.

Example 2

The experiment is run in a pass-through reaction vessel similarly to Example 1. Fed into the reaction vessel are 2 gram-moles isobutylene, 4 gram-moles ammonia and 5 gram-moles atmospheric oxygen at a temperature of 420° to 430°C in the presence of a Bi-Mo-P catalyst, the conversion being 50 percent and the isobutylene conversion being 45 percent in terms of methacrylonitrile, 25 — acetonitrile, 8 — hydrocyanic acid, 20 — carbon-dioxide gas and 2 — carbonyl compounds (methacrolein and acrolein).

The thus-obtained mixture of the reaction products, containing 30 g methacrylonitrile, 20 g acetonitrile and 8.6 hydrocyanic acid is subjected to processing similar to Example 1, after neutralization of the unreacted ammonia.

The thus-formed reaction mixture is dehydrated at an equimolar ratio of the starting components, a temperature of 30°–35°C for 10 to 15 min. and then is fractionated at atmospheric pressure. The isolated fraction contains 70–75 weight percent methacrylontrile and 25–30 weight percent acetonitrile.

Example 3

The experiment is carried out similarly to Example 1.

Fed into the reaction vessel are 1 gram-mole isobutylene, 2 gram-moles ammonia and 2.5 gram-moles atmospheric oxygen at 380°–400°C in the presence of a Bi-Mo-W-P catalyst. The isobutylene conversion percentage equals 60, while the percentage of the isobutylene transformation into methacrylate is 65 percent, into acetonitrile, 14 percent, into hydrocyanic acid, 7 percent, into carbon-dioxide gas, 13 percent, and into carbonyl-containing compounds, 1 percent.

The mixture of the thus-obtained products is processed as described in Example 1. Then dehydration is appropriately carried out whose products are subject to fractional distillation to isolate the fraction containing 80–82 weight percent methacrylonitrile and 18–20 weight percent acetonitrile.

Example 4

The experiment is carried out similarly to Example 1.

The mixture of the reaction products of oxidation ammonolysis is treated with acetone in the presence of a 40-percent caustic potash solution taken in an amount of 2 percent of the HCN and acetone aggregate weight. The experiment takes 150 minutes and runs at 0°–10°C. The resultant product is dehydrated as described in Example 1 without having preliminarily been neutralized and separated. After fractional distillation, the fraction is isolated, containing 78–80 weight percent methacrylonitrile and 20–22 weight percent acetonitrile.

Example 5

The experiment is carried out similarly to Example 1.

The mixture of the isobutylene oxidation-ammonolysis reaction products is treated with acetone, the experiment running at 40°–50°C within 30 to 40 min.

The obtained product is dehydrated similarly to Example 1. After fractional distillation of the dehydration products, the fraction is isolated, containing 66–70 weight percent methacrylonitrile and 30–34 weight percent acetonitrile.

Example 6

The experiment is carried out similarly to Example 1.

In the dehydration reaction use is made of pyridine instead of quinoline as an organic base. Upon fractionation of the dehydration products, the fraction is isolated, containing 60 weight percent methacrylonitrile, 20-25 weight percent acetonitrile and 15-20 weight percent pyridine.

Example 7

The experiment is run similarly to Example 1. During the dehydration reaction in the presence of phosphoric anhydride and quinoline, a temperature of 0° to 10°C is maintained for 40-60 min. Upon fractionation of the dehydration products, the fraction is isolated, containing 79-80 weight percent methacrylonitrile and 20-21 weight percent acetonitrile.

Example 8

The experiment is run similarly to Example 1. When conducting the reaction of dehydration of the acetone-pretreated products of the isobutylene oxidation ammonolysis, a temperature of 25°-35°C is maintained for 10-15 min., the reaction proceeding in a medium of phosphoric anhydride and quinoline, at a ratio of ACH, $P_2O_5$ and quinoline equal to 1:1.5:2. Upon fractionation of the reaction mixture at atmospheric pressure, the fraction is isolated, containing 89-91 weight percent methacrylonitrile and 9-11 weight percent acetonitrile.

Example 9

The experiment is run similarly to Examples 1 and 8. When running the dehydration reaction, use is made of the starting components, viz., ACH, $P_2O_5$ and quinoline, taken at a ratio of 1:2:4. Upon fractionation of the reaction mixture, a fraction is isolated, consisting of 87-89 weight percent methacrylonitrile and 11-13 weight percent acetonitrile.

Example 10

The experiment is run similarly to Examples 1 and 8. The components of the dehydration reaction (ACH, $P_2O_5$ and quinoline) are taken at a ratio of 1:3:6. Upon fractionation, a fraction is isolated, containing 83-85 weight percent methacrylonitrile and 15-17 weight percent acetonitrile.

What is claimed is:

1. In the method of producing methacrylonitrile comprising catalytically reacting isobutylene and ammonia in the presence of air oxygen to form a mixture comprising methacrylonitrile, acetonitrile, hydrocyanic acid and unreacted ammonia and subsequently neutralizing the unreacted ammonia, the improvement comprising treating the neutralized mixture with an equimolar amount of acetone based on the hydrocyanic acid at a temperature of 0°-50°C in the presence of an alkali metal hydroxide to form acetone cyanohydrin, reacting the acetone cyanohydrin without separation from the reaction mixture with phosphoric anhydride in the presence of a polar organic base at a temperature of 0°-35°C with the molar ratio of acetone cyanohydrin: phosphoric anhydride: polar organic base being 1:1.5 - 3:2-6; and isolating the methacrylonitrile.

2. The method according to claim 1 wherein the polar organic base is quinoline.

* * * * *